Sept. 13, 1966   A. R. WALKER   3,272,551
THEFT-PROOF CAGE FOR AUTOMOBILE BODY TRUNKS
Filed Aug. 26, 1964
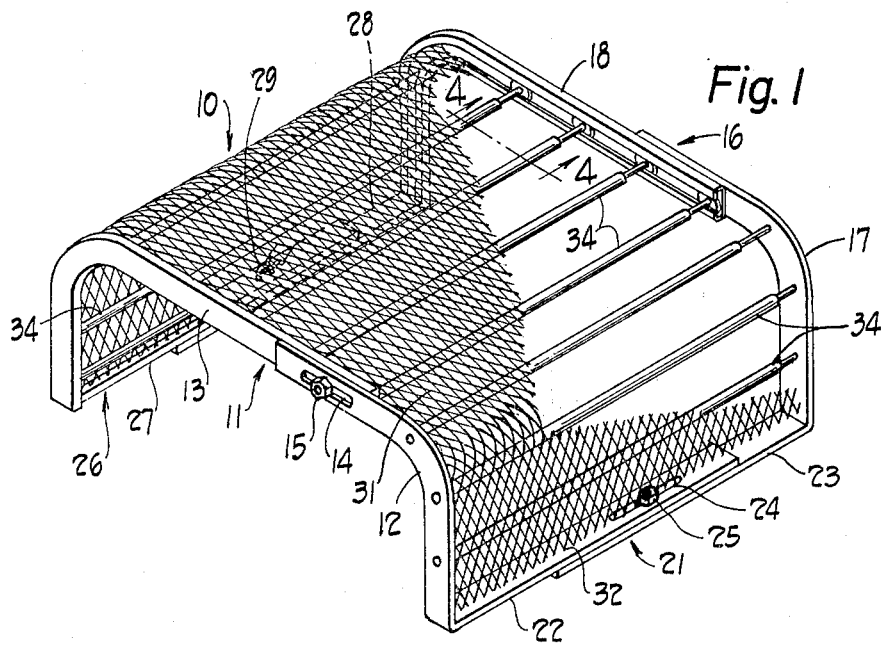
Fig. 1
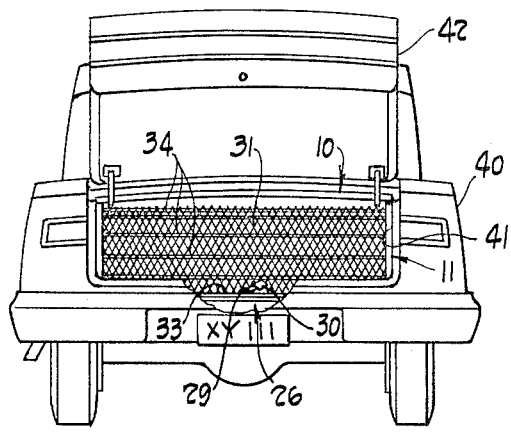
Fig. 2
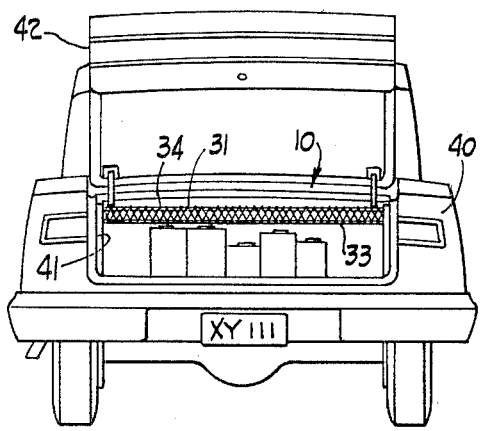
Fig. 3
Fig. 4
INVENTOR.
ALONZO R. WALKER
BY
Sanford Schnurmacher
ATTORNEY.

3,272,551
THEFT-PROOF CAGE FOR AUTOMOBILE
BODY TRUNKS
Alonzo R. Walker, Cleveland, Ohio, assignor of fifty
percent to Anthony Viveiros, Cleveland, Ohio
Filed Aug. 26, 1964, Ser. No. 392,192
2 Claims. (Cl. 296—37)

This invention relates to safety devices and particularly to a theft-proof cage for automobile body trunks.

The primary object of this invention is to provide a theft-proof cage for installation inside an automobile body trunk that will protect the contents therein even if the trunk lid lock should be broken or the lid pried open.

Another object is to provide such a cage that can be adapted to fit trunks of varied widths and lengths.

A further object is to provide such a theft-proof cage that requires only floor bolts for its installation, thus not altering the outside appearance of the trunk of an automobile in any way.

Another object is to provide a device that is economical to manufacture, rugged in construction and reliable in operation.

These and other objects of the invention will become apparent from a reading of the following specification and claims, together with the accompanying drawing, wherein:

FIGURE 1 is a perspective view of the theft-proof cage for automobile body trunks that is the subject of this invention, with portions of the wire mesh cover broken away to show the cover supporting ribs;

FIGURE 2 is a rear elevation of the same, showing it installed in an automobile body trunk, in its closed and locked condition;

FIGURE 3 is a view similar to that of FIGURE 2, but showing the cage in its open condition, wherein access is given to the interior of the protected area of the trunk; and, FIGURE 4 is an enlarged view of the cage flexible cover, taken along the line and in the direction of the arrows 4—4 of FIGURE 1.

Referring more particularly to the drawing, there is seen in FIGURE 1, thereof, the theft-proof cage for automobile body trunks, that is the subject of this invention, broadly indicated by reference numeral 10.

The cage 10 is adapted to be mounted on the floor of the trunk 41 of a conventional automobile body 40, as seen in FIGURES 2 and 3.

The cage comprises a frame fabricated from two U-shaped flat tubular channels 11 and 16 spaced apart and joined at the lower ends of their legs by base elements 21 and 26, made of flat stock steel. In a preferred form of channel, illustrated in FIGURE 4, the channel is 1" high, ⅜" wide, with a ½" slot extending the length thereof.

Each channel 11 and 16 is made up of two overlapping sections 12–13 and 17–18, respectively, as seen most clearly in FIGURE 1.

The sections have adjustment slots 14 at their overlaps through which adjustment bolts 15 pass.

Thus, the overall length of the frame can be adjusted, from front to rear, to fit trunks of different lengths.

Similar adjustment of the width of the frame is achieved by making the bases 21 and 26 of overlapping flat stock 22–23 and 27–28, respectively, which are slotted at 24 and locked together in adjusted positions by bolts 25, positioned in the slots.

The inverted U-shaped frame, thus provided, has a horizontal middle section with dependent legs which make it adapted for use in the trunks of late model automobiles, which have flat topped trunks which blend into the body after a long horizontal sweep.

As seen most clearly in FIGURE 4, each channel has a slot 20, extending the length of the inner face thereof, which intersects the hollow rectangularly shaped interior 19 of the channel to define a track.

The slots 20 of the two channels 11 and 16 are opposed and aligned with each other.

Reference numeral 34 indicates a cover supporting rib having a tubular sleeve whose length is such that it will just clear the channels 11 and 16 when placed cross-wise therebetween with the frame set at its minimum width.

Separate axles, or shafts, 35 are telescopically interfitted in each sleeve 34, at both ends thereof, and extend outwardly therefrom through the channel slots 20.

A wheel, or roller, 36 is journaled at the outer end of each axle 35, within the channel track 19, free to roll lengthwise of the track 19, carrying their attached ribs 34 lengthwise of the track with them.

The length of the axle 35 is such that the frame can be widended several inches, while still insuring the firm, rigid, seating of the axles 35 in the rib sleeves 34, as seen in FIGURE 4.

Reference numeral 31 indicates a flexible wire, or chain mesh cloth ⅛" to ¼" thick which is so closely woven that the jaws of a chain or wire cutting tool cannot be inserted in the mesh operatings, thus making it impossible for unauthorized persons to breach the cover which is formed by supporting the cloth 31 on the spaced rib sleeves 34, and welding the chain cloth thereto, as seen in FIGURE 4.

The forward end of the flexible cover cloth 31 is permanently welded to the forward base plate 21 of the frame.

The rear end of the cover 31 has a flat closure bar 33 welded there-across. The bar 33 has a hasp slot therethrough, adapted to receive a hasp staple 29, extending upward from the rear base plate 26, as seen in FIGURE 2.

The length of the cover 31 is such that the closure bar 33 will seat on the base plate 26 when the frame is extended to its maximum length.

The cover cloth 31 can be moved with the ribs 34 toward or away from the rear end of the frame, along the channels 11 and 16 on the rib rollers 36, in the manner of the top of a roll-top desk.

The number of ribs is such that the flexible cloth may be supported as a relatively flat cover, when in its closed position.

The so fabricated cage 10 is positioned and fitted in the car trunk 41 with its side channels 11 and 16 pressed against the side walls of the trunk, with its base plates 21 and 26 resting on the trunk floor.

The base plates are then bolted to the floor of the trunk.

As seen in FIGURE 2, which shows the cage in its closed condition, a padlock 30 is passed through the hasp staple 29 to hold the cover closure bar 33 locked against the base plate 26.

The area within the cage 10 is now inaccessible to unauthorized persons.

Upon removal of the padlock the rear end of the cover 31 can be rolled upward and forward, on the channel rails 19 to give full access to the area enclosed by the cage 10.

The cage 10 covers the full width and length of the interior of the trunk 41 below the lid 42.

Spare tires, mounted flat on the floor or upright in the trunk 41, are fully protected since the cage frame touches the trunk floor and side walls at its peripheral edge only, and does not interfere with any tire mounting brackets involving the floor or side walls of the trunk 41.

The cage frame is anchored solidly on the floor of the trunk. No special side anchorage is necessary since the plurality of transverse ribs 34 prevent inward tilting of the channels 11 and 16, away from the trunk sides.

Thus the installation of the device is relatively simple, requiring no modification or defacement of the trunk structure itself.

It will now be clear that there is provided a device which accomplishes the objectives set forth.

While the invention has been disclosed in its preferred form, it is to be understood that the specific embodiment thereof, as described and illustrated herein is not to be considered in a limited sense, as there may be other forms or modifications of the invention which should also be construed to come within the scope of the appended claims.

I claim:

1. In combination with an automobile body trunk, a theft-proof cage, comprising, a frame member having two inverted, substantially U-shaped, flat, tubular channels spaced apart and joined through forward and rear base plates secured to the leg ends of the channels; each channel having a continuous track slot faced inwardly, toward the opposite channel, and aligned with the track slot thereof; a cover member, for the frame, having a plurality of ribs mounted cross-wise of the frame, between the channels, with their ends extending into opposite channel track slots; each rib having rollers journaled on the ends thereof, in the channel tracks, free to roll longitudinally thereof, the so mounted ribs being free to move toward or away from each other; the cover member also having a single length of flexible wire mesh secured to and supported on the upper surfaces of all the ribs, between the frame channels, and immovably anchored at its forward end to the frame member forward base plate, and releasably engageable at its rear end with the frame member rear base plate; the frame member being mountable in the trunk with its channels fitted against the side walls of the trunk, extending from the front to the rear thereof, and with its base plates bolted to the trunk floor; the cover member being movable longitudinally of the frame member channel tracks between a first, closed position wherein the cover member prevents access to the area of the trunk enclosed by the frame member, and a second, open, position wherein the cover member is retracted along the frame channel tracks to provide access to said area; and, means mounted on the rear frame base plate, engageable with the cover member, to prevent movement of the cover member from its first position to its second position, when so engaged.

2. The structure defined in claim 1, wherein, each rib comprises a hollow sleeve adapted to be positioned between the frame channels and support the flexible wire mesh cloth thereon, a shaft telescopically fitted into each end of the sleeve, and extending outwardly therefrom; and a channel track engaging roller journaled at the outer end of each shaft.

References Cited by the Examiner

UNITED STATES PATENTS

| | | | |
|---|---|---|---|
| 2,060,362 | 11/1936 | Zurcher | 296—1 |
| 2,107,887 | 2/1938 | Horsley | 160—231 |
| 2,812,814 | 11/1957 | Fogh | 296—23 |

BENJAMIN HERSH, *Primary Examiner.*

P. GOODMAN, *Assistant Examiner.*